US012203295B2

(12) United States Patent
Konrad et al.

(10) Patent No.: US 12,203,295 B2
(45) Date of Patent: Jan. 21, 2025

(54) DOOR HANDLE ARRANGEMENT AND METHOD FOR CHECKING THE PERMISSIBILITY OF THE OPERATING SPEED OF A HANDLE BODY OF THE DOOR HANDLE ARRANGEMENT

(71) Applicant: MERCEDES-BENZ GROUP AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 305 days.

(21) Appl. No.: 17/769,503

(22) PCT Filed: Oct. 1, 2020

(86) PCT No.: PCT/EP2020/077525
§ 371 (c)(1),
(2) Date: Apr. 15, 2022

(87) PCT Pub. No.: WO2021/073887
PCT Pub. Date: Apr. 22, 2021

(65) Prior Publication Data
US 2023/0243192 A1 Aug. 3, 2023

(30) Foreign Application Priority Data
Oct. 17, 2019 (DE) ..................... 10 2019 007 216.2

(51) Int. Cl.
*E05B 77/04* (2014.01)
*E05B 81/76* (2014.01)
(Continued)

(52) U.S. Cl.
CPC .............. *E05B 77/04* (2013.01); *E05B 81/76* (2013.01); *E05B 85/107* (2013.01); *E05B 85/16* (2013.01)

(58) Field of Classification Search
CPC .......... E05B 77/04; E05B 81/76; E05B 81/77; E05B 85/16; E05B 85/107; Y10T 292/57; G05B 19/00; G06F 7/04; H04B 3/00
(Continued)

(56) References Cited

U.S. PATENT DOCUMENTS 7,102,487 B2 * 9/2006 Mafune .............. G07C 9/00309 340/552
11,371,270 B2 * 6/2022 Leonardi ................. E05B 81/86
(Continued)

FOREIGN PATENT DOCUMENTS

CN 108973904 A * 12/2018
CN 212054206 U * 12/2020 ........... B60Q 1/2669
(Continued)

OTHER PUBLICATIONS

International Search Report mailed Jan. 11, 2021 in related/corresponding International Application No. PCT/EP2020/077525.
(Continued)

*Primary Examiner* — Eugene G Byrd
*Assistant Examiner* — James Edward Ignaczewski
(74) *Attorney, Agent, or Firm* — PATENT PORTFOLIO BUILDERS PLLC

(57) ABSTRACT

A door handle arrangement for a moveable component of a vehicle includes a control device for checking the permissibility of the operating speed of a handle body of the door handle arrangement to determine whether a permissible operating situation of the vehicle or a critical situation of the vehicle exists.

18 Claims, 4 Drawing Sheets

Figure 1:
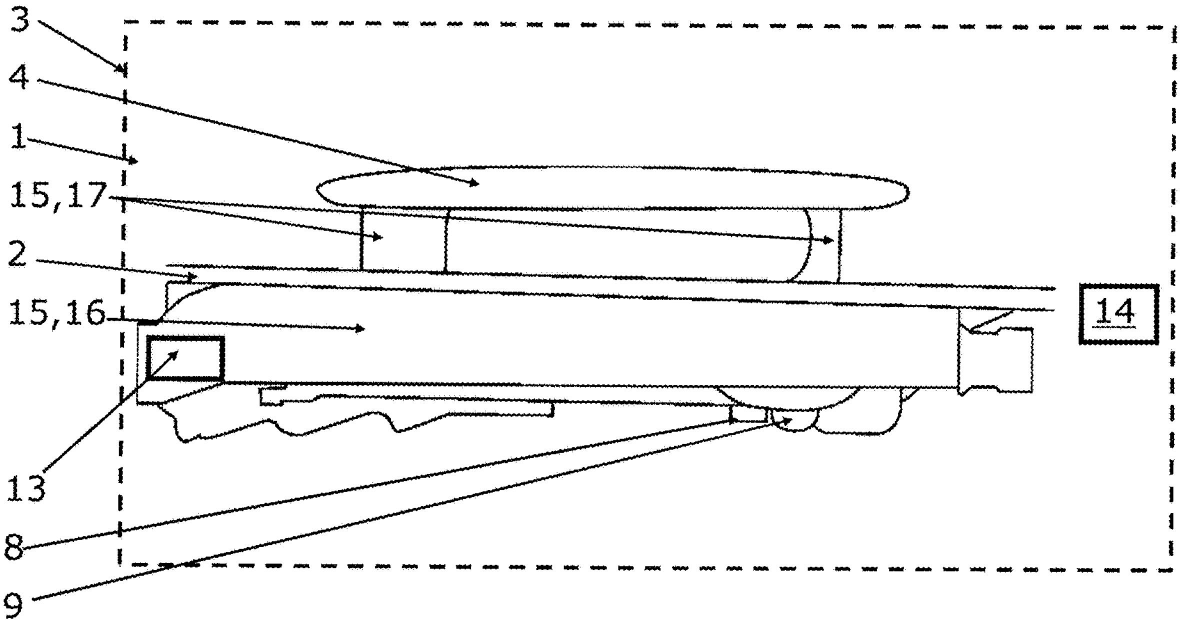

(51) Int. Cl.
*E05B 85/10* (2014.01)
*E05B 85/16* (2014.01)

(58) Field of Classification Search
USPC .................................. 70/263; 340/5.27, 5.72
See application file for complete search history.

(56) References Cited

U.S. PATENT DOCUMENTS

| | | | | |
|---|---|---|---|---|
| 2004/0183651 | A1* | 9/2004 | Mafune | B60R 25/246 340/5.7 |
| 2019/0071898 | A1* | 3/2019 | Beck | E05B 81/77 |
| 2020/0011096 | A1* | 1/2020 | Leonardi | E05B 81/78 |
| 2021/0148144 | A1* | 5/2021 | Schatz | B60R 25/246 |

FOREIGN PATENT DOCUMENTS

| | | | | |
|---|---|---|---|---|
| DE | 19919765 | A1 | 11/2000 | |
| DE | 20215283 | U1 | 11/2003 | |
| DE | 102014016883 | A1 | 5/2015 | |
| DE | 102014015476 | A1 | 4/2016 | |
| DE | 202017104891 | U1 | 9/2017 | |
| DE | 102020125390 | A1 * | 3/2022 | |
| EP | 2813653 | A2 | 12/2014 | |
| WO | 2017129333 | A1 | 8/2017 | |
| WO | WO-2018190572 | A1 * | 10/2018 | |
| WO | WO-2020239915 | A1 * | 12/2020 | E05B 81/77 |

OTHER PUBLICATIONS

Written Opinion mailed Jan. 11, 2021 in related/corresponding International Application No. PCT/EP2020/077525.

* cited by examiner

DOOR HANDLE ARRANGEMENT AND METHOD FOR CHECKING THE PERMISSIBILITY OF THE OPERATING SPEED OF A HANDLE BODY OF THE DOOR HANDLE ARRANGEMENT

BACKGROUND AND SUMMARY OF THE INVENTION

Exemplary embodiments of the invention relate to a door handle arrangement for a moveable component of a vehicle and a method for checking the permissibility of the operating speed of a handle body of such a door handle arrangement.

DE 199 19 765 A1 describes a motor vehicle door lock having a locking latch and a safety catch holding the locking latch in a main catch and a preliminary catch, having an electrical opening auxiliary drive, which is switched on in order to raise the safety catch from the main catch or the preliminary catch of the locking latch, having an electrical auxiliary drive, which is switched on after the locking latch has reached a pre-closure position, and then transfers the locking latch motorically into the main closing position, and having a control electronic system. The locking auxiliary drive has an electrical drive engine and a reduction gear, which is coupled to the locking latch on the output side with a drive element, and wherein a coupling to the locking latch can be de-coupled.

DE 202 15 283 U1 describes an assembly of a motor vehicle having an electrical, electro-optical, or electromechanical functioning unit, which can be connected to a further unit of the motor vehicle via one or more electrical or optical connection lines, and a pressure sensor, which is formed for sensing a pressure or a pressure change. The pressure or the pressure change is caused by a deformation of a part of the motor vehicle, wherein a signal correlating to the pressure or the pressure change can be transferred from the pressure sensor by means of an electrical or optical signal line, in order to control a retainer unit, and the electrical or optical lines of the functioning unit and the pressure sensor can be attached together by means of one and the same attachment unit.

WO 2017/129333 A1 describes a door handle system for a moveable part, such as a door or a hatch, for example, in a vehicle with a handle strap, which can be arranged on a moveable part and serves to move the moveable part, and a handle lever, which is moveably mounted and serves to actuate a latch for the moveable part.

To improve comfort, WO 2017/129333 A1 provides that at least one first actuating position of the handle lever can be detected by a first sensor in a metrological way, whereby an electrical actuation of the latch can be triggered by a signal from the first sensor. This signal from the first sensor can cause the electrical latch to open automatically in order to be able to pull up the moveable part.

It is problematic with this known prior art that, in critical situations, in particular in vehicle accidents and/or in crash situations, the latch is actuated. This can lead, for example, to a moveable component being released during a critical situation by the latch and an insufficient protection for occupants of the vehicle being able to be provided.

Exemplary embodiments of the present invention are directed to a door handle arrangement and a method for such a door handle arrangement, which prevents a release of moveable parts of the vehicle in a critical situation, in particular during a vehicle accident or during a crash situation.

The present invention is based on the general thought of carrying out a check for permissibility of the operating speed of the door handle, in order to establish whether an admissible operating situation of the vehicle or a critical situation of the vehicle, in particular a vehicle accident and/or a crash situation, is present.

The door handle arrangement according to the invention for a moveable component of a vehicle comprises a handle body, which can be moved between a rest position and an actuation position along a stroke path.

The vehicle can be, for example, a motor vehicle without rails, an electric vehicle without rails, a hybrid vehicle without rails and/or a plug-in hybrid vehicle without rails.

The moveable component can be, for example, a vehicle door, in particular an external door of the vehicle, and/or a vehicle hatch, in particular an outer hatch of the vehicle.

The handle body can be a door outer handle.

The handle body can be mounted moveably in relation to the moveable component. Here, it can be provided that the handle body is arranged in the rest position when no mechanical actuation of the handle body is carried out by a vehicle user. It can be provided at the latest in the actuation position that the handle body enables an actuation of the moveable component, in particular by means of a mechanical force transmission and/or rotational moment transfer. In doing so, access to the interior chamber of the vehicle is granted to a vehicle user, for example.

The stroke path of the handle body between the rest position and the actuation position can be formed to be at least sectionally straight-lined and/or at least sectionally curve-lined and/or bent. The handle body can carry out a translational movement at least sectionally and/or a rotational movement at least sectionally during a movement out of the rest position into the actuation position along the stroke path.

The door handle arrangement according to the invention comprises a first sensor device and a second sensor device. The first sensor device can be triggered with a movement of the handle body from the rest position into the actuation position in a first triggering position, wherein the second sensor device can be triggered with a movement of the handle body from the rest position into the actuation position in a second triggering position in relation to the stroke path.

The first sensor device and the second sensor device can be arranged spaced apart from each other. The first sensor device and the second sensor device can be arranged spaced apart from each other in relation to the stroke path of the handle body.

The first trigger position in relation to the stroke path of the handle body can be metrologically recorded by the first sensor device. The second trigger position in relation to the stroke path of the handle body can be metrologically recorded by the second sensor device. A metrological triggering of the respective sensor device in the respective trigger position can be carried out, for example, mechanically, electromagnetically, optically, magnetically, and/or electrically.

The first triggering position and the second triggering positions are offset in relation to the stroke path of the handle body by a pre-defined stroke path spacing. This stroke path spacing can be set by constructive designs of the door handle arrangement, in particular by the constructive design of the handle body and/or by the constructive design of a guide arrangement guiding the handle body.

It can be provided that the stroke path spacing is smaller than the stroke path between the rest position and the actuation position. It can be provided that the stroke path spacing is smaller than half the stroke path between the rest position and the actuation position. It can be provided that the first triggering position is arranged closer to the rest position in relation to the stroke path than the second triggering position. It can be provided that the spacing between the second triggering position and the actuation position in relation to the stroke path is greater than the stroke path spacing. It can be provided that the first triggering position and the second triggering position are formed between the rest position and the actuation position in relation to the stroke path.

It can be provided that the door handle arrangement can be calibrated in a calibration mode to the effect that the length of the entire stroke path and/or the stroke path spacing is ascertained by the control device by means of an actuation of the handle body out of the rest position into the actuation position along the stroke path. To do so, the control device can implement a calibration method in a calibration mode. The ascertained entire stroke path and/or the stroke path spacing can be stored in the control device. For example, this makes it possible to exactly and/or individually record the stroke movement spacing as part of present component tolerances.

It can be provided that the first sensor device is triggered consistently when the handle body is between the first triggering position and the actuation position in relation to the stroke path. It can be provided that the second sensor device is consistently triggered when the handle body is between the second triggering position and the actuation position in relation to the stroke path.

The first sensor device and the second sensor device are connected in a communicative manner to a control device, in order to transmit measuring signals to the control device. It can be provided that the measuring signals are continuously transmitted to the control device and/or the control device continuously retrieves and/or records the measuring signals.

The door handle arrangement according to the invention comprises a locking device for releasing or for locking a moveable component of a vehicle, wherein the locking device is connected in a communicative manner to the control device. The locking device can be controlled via the control device. The locking device can comprise an electrically operated actuator (e.g., a servo-opening), which forms a lock of the moveable component of the vehicle in a first position in such a way that the moveable component cannot be moved in relation to the vehicle. In a second position of the electrically operated actuator, the moveable component of the vehicle can be released, such that the moveable component can be moved in relation to the vehicle.

The control device is formed and/or programmed to carry out a check for permissibility of the operating speed of the handle body. Here, it can be provided that the control device enables a release of the moveable component of the vehicle via the locking device only when the operating speed of the handle body is permissible. If the operating speed of the handle body is not permissible, in particular when the operating speed is quicker than a typical operating speed by a vehicle user, the control device can prevent a release of the moveable component of the vehicle and/or lock the moveable component of the vehicle via the locking device. The control device can decide based on the operating speed of the handle body as to whether a permissible operating situation of the vehicle or a critical situation of the vehicle is present.

In doing so, the safety of the vehicle occupants in critical situations, in particular during a vehicle accident and/or during a crash situation, can be increased, since an erroneous function of the locking device is prevented, and the movable component of the vehicle does not carry out any inadmissible movement, in particular any movement dangerous to the vehicle occupants, during the critical situation.

Here, a communicative connection is understood to mean that a bidirectional or unidirectional data connection can be provided between two components connected to each other in a communicative manner, with which electrical and/or optical control, regulating and/or measuring signals can be transmitted in analog or digital form. The communication between more than two components can be implemented with a bus system.

Furthermore, the invention relates to a method for checking the permissibility of the operating speed of a handle body of a door handle arrangement according to the invention.

From the measuring signals transmitted of the first sensor device, the control device ascertains a first triggering signal at a first triggering point in time at which the handle body is in the first triggering position in relation to the stroke path. From the measuring signals transmitted of the second sensor device, the control device ascertains a second triggering signal at a second triggering point in time at which the handle body is in the second triggering position in relation to the stroke path.

From the measuring signals transmitted of the first sensor device, the control device can ascertain the first triggering point in time of the first triggering signal. From the measuring signals transmitted of the second sensor device, the control device can ascertain the second triggering point in time of the second triggering signal.

The triggering signal of the first sensor device and/or the second sensor device can be identifiable due to a measuring signal skip. Here, it can be provided, for example, that the measuring signal of the respective sensor device changes from a lower value (e.g., 0-value or low value) to a higher value (e.g., 1-value or high value) or vice-versa when the handle body runs through the respective triggering position in relation to the stroke path. Such a measuring signal skip can also be regarded as a temporally abrupt change of the measuring signal.

From the time difference of the first triggering point in time and the second triggering point in time, the control device ascertains as to whether the operating speed of the handle body is permissible, wherein the control device transmits a release signal for releasing the moveable component of the vehicle to the locking device if the operating speed of the handle body is permissible. The release of the moveable component can be carried out via a servo-opening with an electrical actuator. An operating speed of the handle body can be regarded as permissible when it corresponds to a typical operating speed by human force effect. An operating speed of the handle body can be regarded as unreliable when the operating speed is quicker than the typical operating speed by human force effect, such that such an operating speed can be generated, for example, only by a collision or an accident.

It can be provided that the control device ascertains, in particular, before ascertaining the time difference, whether a first triggering signal and whether a second triggering signal are present. It can be provided in terms of signals and/or programming that the first triggering signal and the second triggering signal are connected for this to an AND-conjunction in a signal-technical and/or program-technical manner. If the first triggering signal or the second triggering signal is not present, the control device does not transmit any triggering signal for triggering the moveable component of the vehicle to the locking device. An error of a triggering signal can indicate an erroneous function or destruction of a sensor device, such that a release of the moveable component should be prevented in such a case. Due to such a redundant check, the safety function can be further increased.

It can be provided that an absolute amount is ascertained when ascertaining the time difference.

In an advantageous development of the solution according to the invention, it is provided that the control device transmits a latching signal for latching the moveable component of the vehicle to the locking device if the operating speed of the handle body is impermissible. It can also be provided that the control device initiates a latching of several separate movable components of the vehicle. It can also be provided that the control device carries out a latching of all moveable components, in particular all vehicle doors and/or vehicle hatches, of the vehicle.

In a further advantageous embodiment of the solution according to the invention, it is provided that the control device compares the time difference ascertained with a threshold time duration stored in the control device, wherein the threshold time duration depends on the predefined stroke path spacing. The threshold time duration can be determined, for example, from the predefined stroke path spacing and a threshold speed. The operating speed of the handle body is impermissible when the time difference is smaller than the threshold time duration or corresponds to this. The operating speed of the handle body is permissible when the time difference is greater than the threshold time duration.

In an advantageous development of the solution according to the invention, it is provided that the control device ascertains the operating speed of the handle body from the time difference ascertained and the predefined stroke path spacing, wherein the predefined stroke path spacing is stored in the control device.

The control device compares the ascertained operating speed of the handle body with a threshold speed stored in the control device. The operating speed of the handle body is impermissible when the operating speed is greater than the pre-defined threshold speed or corresponds to this. The operating speed of the handle body is permissible when the operating speed of the handle body is smaller than the threshold speed.

In a further advantageous embodiment of the solution according to the invention, it is provided that the stroke path spacing is ascertained by means of calculations, measurements and/or simulations, and/or the threshold time duration is ascertained by means of calculations, measurements and/or simulations, and/or the threshold speed is ascertained by means of calculations, measurements and/or simulations. The stroke path spacing ascertained in this way and/or the threshold time duration ascertained in this way and/or the threshold speed ascertained in this way can be stored in the control device.

In an advantageous development of the solution according to the invention, it is provided that the stroke path spacing ranges from 2 mm to 8 mm, in particular is 4 mm, and/or the threshold time duration ranges from 4 ms to 16 ms, in particular is 8 ms, and/or the threshold speed is 500 mm/s.

A stroke path spacing ranging from 2 mm to 8 mm or a threshold time duration ranging from 4 ms to 16 ms enables an evaluation of the measuring signals with a desired evaluation safety.

The total stroke path can be, for example, 22 mm to 26 mm, in particular 24 mm.

In a further advantageous embodiment of the solution according to the invention, it is provided that at least one sensor device transmits further measuring signals to the control device after triggering, wherein the further measuring signals and/or the temporal course of the further measuring signals are included when ascertaining the permissibility of the operating speed of the handle body. In particular, the temporal course of the further measuring signals can be used in order to improve the evaluation safety of the time difference and/or the operating speed of the handle body.

Here, it can be advantageous when such a sensor device forms a Hall sensor, which is further evaluated, in particular continuously and/or incrementally, after triggering at the triggering point of time and after generating a triggering start signal.

In an advantageous development of the door handle arrangement according to the invention, it is provided that the control device is designed and/or programmed in such a way that it carries out the method according to the invention for checking the permissibility of the operating speed of the handle body.

In an advantageous development of the door handle arrangement according to the invention, it is provided that the first sensor device and/or the second sensor device form a contacting sensor device or a contactless sensor device. The first sensor device and/or the second sensor deice can be formed as a button device, switch device or as an optical, magnetic, capacitive, or inductive sensor device, in particular as a Hall sensor device.

It can be provided that the first sensor device is formed as a button device or switch device, in particular as a microswitch device, wherein the second sensor device is formed as a Hall sensor device.

Furthermore, it can be provided that the handle body can be moved between a rest position and an actuation position by means of a guide arrangement in relation to a moveable component of a vehicle along the stroke path, wherein the first sensor device and/or the second sensor device are arranged on the guide arrangement, and/or when moving the handle body, at least partial regions of the guide arrangement release the first sensor device and the second sensor device at their respective trigger positions in relation to the stroke path.

The guide arrangement can have a guide receiver and guide rods. The guide receiver can be arranged on the moveable component of the vehicle. The guide receiver can be formed at least partially or completely by the moveable component of the vehicle. The guide rods can be rigidly connected to the handle body and can be moveably mounted in the guide receiver in such a way that the handle body can be moved between a rest position and an actuation position along the stroke path. Here, it can be provided that at least one guide rod has a trigger means for triggering the first sensor device and/or the second sensor device.

It can be provided that the handle body can be connected to the latch device via a mechanical connection means, in particular via a Bowden cable, in order to enable a mechanical release or locking of the moveable component of the vehicle in the event of an erroneous function or failure of the control device.

Further important features and advantages of the invention emerge from the dependent claims, the drawings and the description of the figures by means of the drawings.

It is understood that the features mentioned above and still to be explained in more detail below can be used not only in the respectively specified combination, but rather also in other combinations or on their own, without leaving the scope of the invention.

BRIEF DESCRIPTION OF THE DRAWING FIGURES

Preferred exemplary embodiments of the invention are depicted in the drawings and are explained in more detail in the description below, wherein the same reference numerals relate to the same or similar or functionally identical components.

Figure 2:
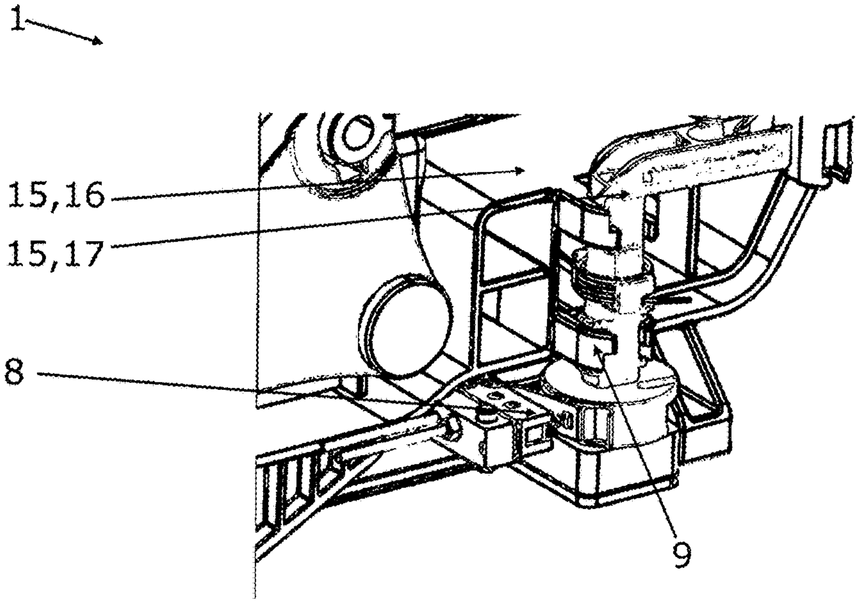
Figure 3:
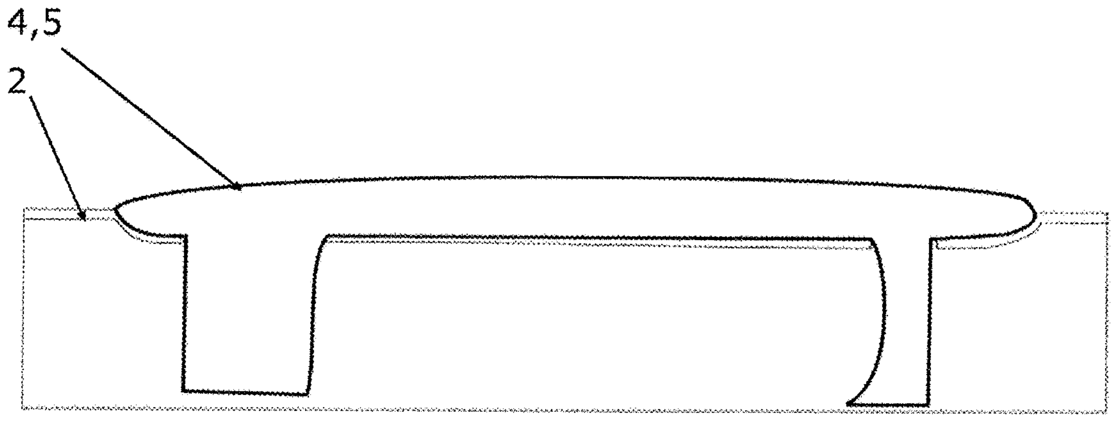
Figure 4:
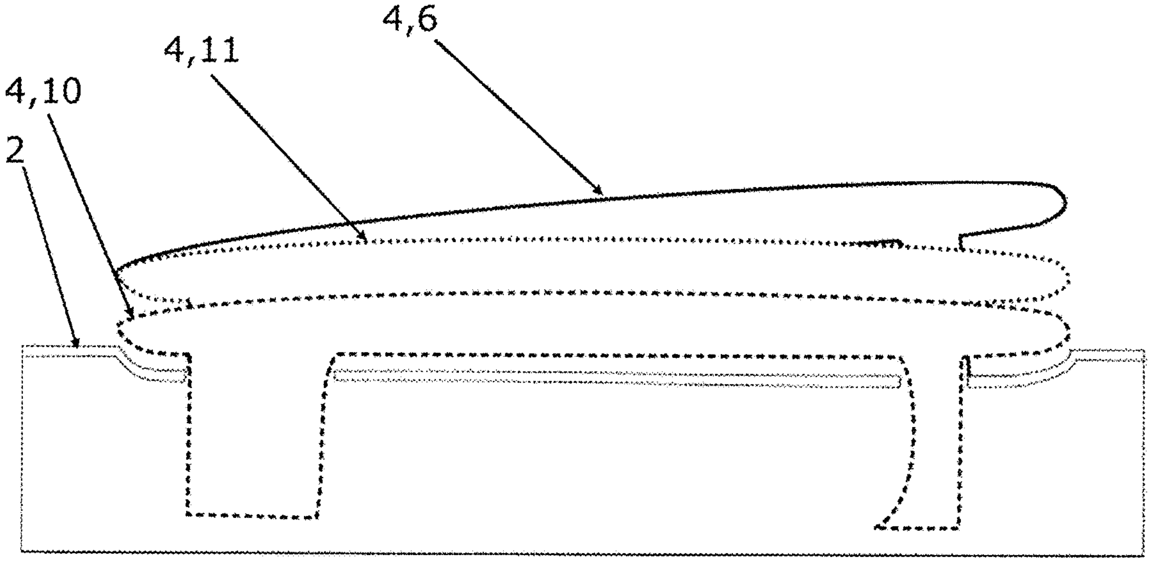
Figure 5:
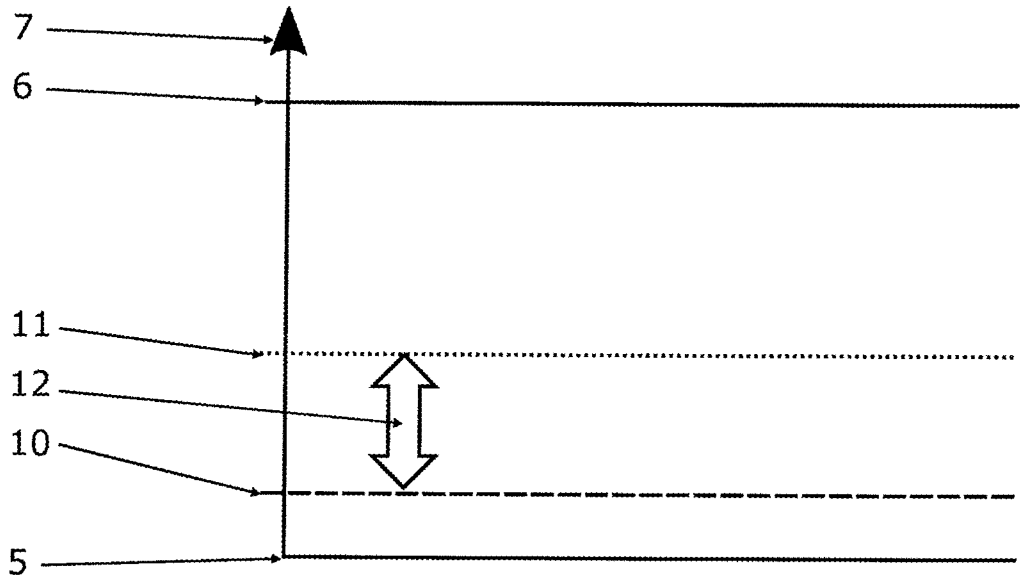
Figure 6:
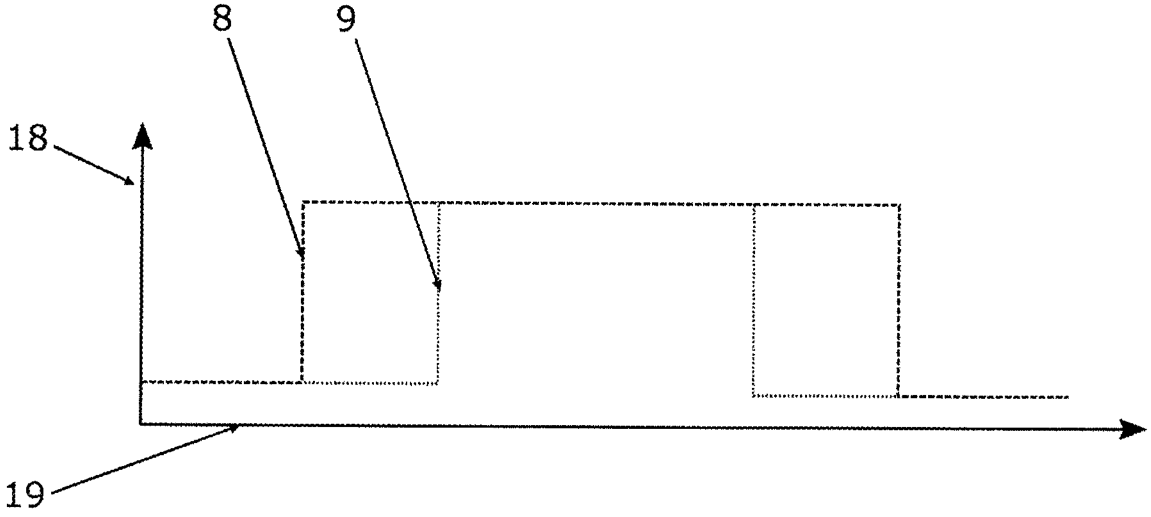
Figure 7:
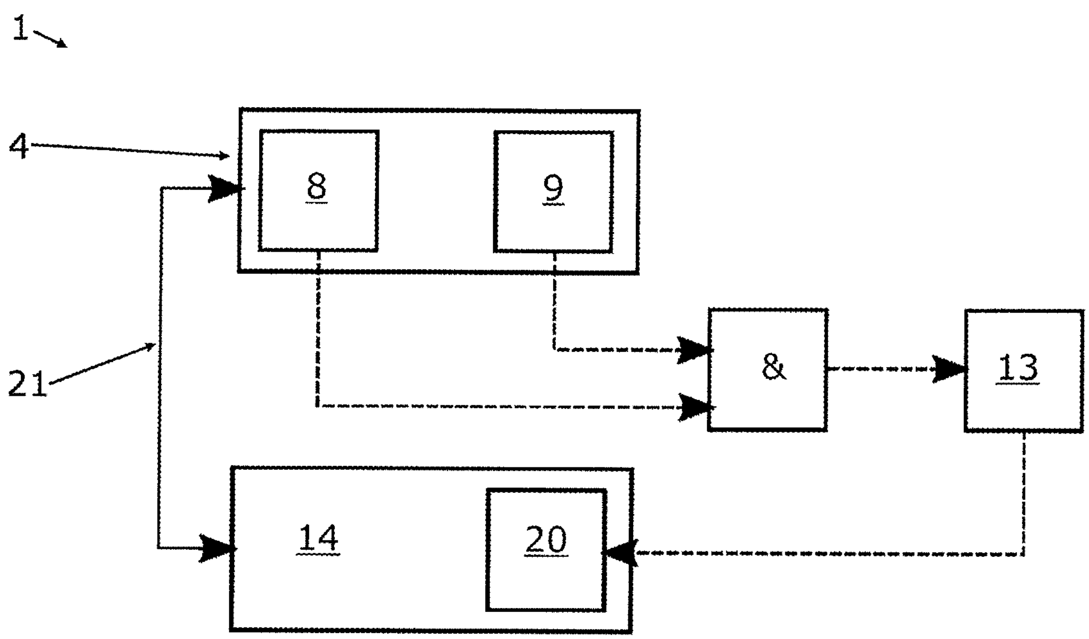

Here are shown, schematically in each case:

FIG. 1 a sketched depiction of a vehicle with a moveable component and a door handle arrangement according to the invention, FIG. 2 a perspective view of a part of a door handle arrangement according to the invention, FIG. 3 a sketched depiction of a handle body in a rest position, FIG. 4 a sketched depiction of a handle body in a first triggering position, in a second triggering position and in an actuation position, FIG. 5 a sketched depiction of the stroke path of a handle body, FIG. 6 a sketched depiction of a signal course of the measuring signals of a first sensor device and a second sensor device of a door handle arrangement according to the invention, FIG. 7 a schematic depiction of a door handle arrangement according to the invention.

DETAILED DESCRIPTION

In FIG. 1, a greatly simplified vehicle 3 is depicted which has a moveable component 2, in particular an outer door of the vehicle 3 with a door covering. Furthermore, a door handle arrangement 1 for the moveable part 2 of the vehicle 3 is depicted. The door handle arrangement 1 comprises a handle body 4, which is formed, in particular, as an outer door handle. Furthermore, a guide arrangement 15 is formed by two guide rods 17 and a guide receiver 16, wherein the guide receiver 16 is arranged on the moveable component 2. The two guide rods 17 are spaced apart from each other and are connected to each other via the handle body 4. The two guide rods 17 at least partially penetrate the moveable component 2 and are moveably mounted in the guide receiver 16 in such a way that the handle body 4 can be moved between a rest position 5 and an actuation position 6 along a stroke path 7. The guide receiver 16 can be formed as a bearing support which can be arranged releasably on the moveable component 2.

The rest position 5 and the actuation position 6 of the handle body 4 are depicted by way of example in FIG. 3 and FIG. 4, respectively. In the rest position 5, the handle body 4 abuts at least partially on the moveable component 2, whereas the handle body 4 in the actuation position 6 is spaced apart at least partially from the moveable component 2.

The door handle arrangement 1 comprises a first sensor device 8 and a second sensor device 9 which are depicted in a perspective view in FIG. 2. The first sensor device 8 can preferably be formed as a micro-switch device. The second sensor device 9 can preferably be formed as a Hall sensor device. The first sensor device 8 and the second sensor device 9 are arranged by way of example at least partially in the guide device 15.

The first sensor device 8 and the second sensor device 9 are connected in a communicative manner to the control device 13, in order to transmit measuring signals to the control device 13. The first sensor device 8 and the second sensor device 9 could be coupled in a signal-technical manner by an And-coupling. Furthermore, a locking device 14 is formed to release or to lock the moveable component 2 of a vehicle 3, wherein the locking device 14 is connected in a communicative manner to the control device 13. The communicating connections between the components are indicated in FIG. 7 by dashed arrows. Here, it can be provided that the control device 13 controls the locking device 14 and/or the control device 13 controls an actuating member 20 of the locking device 14, in particular an electrical actuating member and or a servo-opening. It can be provided that the handle body 4 can be connected to the locking device 14 via a mechanical connection means 21, in particular via a Bowden cable, in order to enable a mechanical release or latching of the moveable component 2 of the vehicle 3 in the event of an erroneous function or a malfunction of the control device 13.

When moving the handle body 4 from the rest position 5 into the actuation position 6, the first sensor device 8 can be triggered in a first triggering position 10 in relation to the stroke path 7. The first trigger position 10 of the handle body 4 is shown by way of example in FIG. 4. A schematic depiction of the first triggering position 10 in relation to the stroke path 7 is indicated in FIG. 5.

When moving the handle body 4 from the rest position 5 into the actuation position 6, the second sensor device 9 can be triggered in a second triggering position 11 in relation to the stroke path 7. The second trigger position 11 of the handle body 4 is depicted by way of example in FIG. 4. A schematic depiction of the second triggering position 11 in relation to the stroke path 7 is indicated in FIG. 5.

The first trigger position 10 and the second trigger position 11 are offset in relation to the stroke path 7 of the handle body 4 by a predefined stroke path spacing 12. The stroke path spacing 12 has a substantially static size caused by the construction.

The control device 13 is formed and/or programmed to carry out a check for permissibility of the operating speed of the handle body 4.

For this, the control device 13 can ascertain a first trigger signal at a first trigger point in time from the measuring signals transmitted, at which point in time the handle body 4 is in the first triggering position 10 in relation to the stroke path 7. The control device 13 ascertains a second trigger signal from the ascertained measuring signals of the second sensor device 13 at a second triggering point in time, at which the handle body 4 is in the second triggering position 11 in relation to the stroke path 7. FIG. 6 shows, by way of example, measuring signals of the first sensor device 8 and the second sensor device 9, wherein a measuring signal axis 18 defines the measurement signal values (e.g., low value and high value) and a temporal axis 19 reflects the temporal course of the measuring signals. A first triggering position 10 can be ascertained, for example, by a rigid jump or a change of the measuring signal of the first sensor device 8. A second triggering position 11 can be ascertained, for example, by a rigid jump or a change of the measuring signal of the second sensor device 9. It can be easily seen in FIG. 6 that the measuring signals of the first sensor device 8 and the measuring signals of the second sensor device 9 form temporally offset measurement signal value jumps, which correspond to the respective triggering points in time.

The control device 13 ascertains from the time difference of the first triggering point in time and the second triggering point in time whether the operating speed of the handle body 4 is permissible, wherein the control device 13 transmits a release signal for releasing the moveable component 2 of the vehicle 3 to the locking device 14 if the operating speed of the handle body 4 is permissible.

Here, the control device 13 compares, for example, the ascertained time difference to a threshold time duration stored in the control device 13, wherein the threshold time duration depends on the predefined stroke path spacing 7. The operating speed of the handle body 4 is impermissible when the time difference is smaller than the threshold time duration or corresponds to this, wherein the operating speed of the handle body 4 is permissible when the time difference is greater than the threshold time duration. The control device 13 can also ascertain from the ascertained time difference and the predefined stroke path spacing 7, for example, the operating speed of the handle body 4, wherein the predefined stroke path spacing 7 is stored in the control device 13. The control device 13 can compare the ascertained operating speed of the handle body 4 to a threshold speed stored in the control device 13, wherein the operating speed of the handle body 4 is impermissible when the operating speed is greater than the predefined threshold speed or corresponds to this, wherein the operating speed of the handle body 4 is permissible when the operating speed of the handle body is smaller than the threshold speed.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A door handle arrangement for a moveable component of a vehicle, the door handle arrangement comprising:
- a handle body movable along a stroke path between a rest position and an actuation position;
- a first sensor device, wherein the first sensor device is triggerable at a first triggering position relative to the stroke path due to movement of the handle body from the rest position and towards the actuation position;
- a second sensor device, wherein the second sensor device is triggerable at a second triggering position relative to the stroke path due to movement of the handle body from the rest position towards the actuation position, wherein the first triggering position and the second triggering position are offset relative to the stroke path of the handle body by a predefined stroke path spacing;
- a locking device configured to release and lock a moveable component of the vehicle; and
- a control device communicatively coupled to the first sensor device, the second sensor device, and the locking device, wherein the control device is configured to perform a permissibility check of an operating speed of the handle body based on signals provided by the first and second sensor devices.

2. The door handle arrangement of claim 1, wherein
- the first sensor device or the second sensor device is a contacting sensor device or a contactless sensor device,
- the handle body is movable, relative to the moveable component along the stroke path between the rest and actuation positions by a guide arrangement, wherein the first sensor device or the second sensor device are arranged on the guide arrangement, or
- when the handle body is moved, at least partial regions of the guide arrangement trigger the first sensor device and the second sensor device at the first and second triggering positions, respectively.

3. The door handle arrangement of claim 1, wherein
- the control device is configured to determine, based on transmitted measuring signals of the first sensor device, a first triggering signal relative to a first triggering time point at which the handle body is located in the first triggering position relative to the stroke path,
- the control device is configured to determine, based on transmitted measuring signals of the second sensor device, a second triggering signal relative to a second triggering time point at which the handle body is located in the second triggering position relative to the stroke path,
- the control device is configured to determine, using a time difference between the first triggering time point and the second triggering time point, whether the operating speed of the handle body is permissible,
- wherein, if the operating speed of the handle body is permissible, the control device is configured to transmit a release signal to release the moveable component of the vehicle from a locking device.

4. The door handle arrangement of claim 3, wherein if the operating speed of the handle body is not permissible, the control device is configured to transmit a locking signal to lock the moveable component of the vehicle to the locking device.

5. The door handle arrangement of claim 3, wherein
- the control device is configured to compare the determined time difference with a threshold time duration stored in the control device,
- the threshold time duration depends on the predefined stroke path spacing,
- the operating speed of the handle body is not permissible if the time difference is less than or equal to the threshold time duration,
- the operating speed of the handle body is permissible if the time difference is greater than the threshold time duration.

6. The door handle arrangement of claim 3, wherein
- the control device is configured to determine the operating speed of the handle body based on the ascertained time difference and the predefined stroke path spacing,
- the predefined stroke path spacing is stored in the control device,
- the control device is configured to compare the determined operating speed of the handle body with a threshold speed stored in the control device,
- the operating speed of the handle body is not permissible if the operating speed is greater than or equal to the predefined threshold speed, the operating speed of the handle body is permissible if the operating speed of the handle body is less than the threshold speed.

7. The door handle arrangement of claim 6, wherein the stroke path spacing is determined by calculations, measurements, or simulations, the threshold time duration is determined by calculations, measurements, or simulations, or the threshold speed is determined by calculations, measurements, or simulations.

8. The door handle arrangement of claim 6, wherein the stroke path spacing is in a range of from 2 mm to 8 mm, the threshold time duration is in a range of from 4 ms to 16 ms, or the threshold speed is 500 mm/s.

9. The door handle arrangement of claim 1, wherein one of the first and second sensor devices is configured to transmit further measuring signals to the control device after a triggering, and wherein the further measuring signals or a temporal course of the further measuring signals are included in the determination of the permissibility of the operating speed of the handle body.

10. The door handle arrangement of claim 1, wherein, along the stroke path of the handle body the first and second triggering positions are between the rest and actuation positions, the first triggering position is between the rest position and the second triggering position, and the second triggering position is between the first triggering position and the actuation position.

11. A method for checking permissibility of an operating speed of a handle body of a door handle arrangement, the method comprising:

determining, using transmitted measuring signals of a first sensor device, a first triggering signal relative to a first triggering time point at which the handle body is located in a first triggering position relative to a stroke path, wherein the handle body is movable along the stroke path between a rest position and an actuation position;

determining, using transmitted measuring signals of a second sensor device, a second triggering signal relative to a second triggering time point at which the handle body is located in a second triggering position relative to the stroke path, wherein the first triggering position and the second triggering position are offset relative to the stroke path of the handle body by a predefined stroke path spacing;

determining, using a time difference between the first triggering time point and the second triggering time point, whether the operating speed of the handle body is permissible; and transmitting, if the operating speed of the handle body is permissible, a release signal for releasing the moveable component of the vehicle to a locking device of the door handle arrangement.

12. The method of claim 11, wherein if the operating speed of the handle body is not permissible, a locking signal for locking the moveable component of the vehicle is sent to the locking device.

13. The method of claim 11, further comprising:

comparing the determined time difference with a stored threshold time duration, wherein the threshold time duration depends on the predefined stroke path spacing, wherein the operating speed of the handle body is not permissible if the time difference is less than or equal to the threshold time duration, and wherein the operating speed of the handle body is permissible if the time difference is greater than the threshold time duration.

14. The method of claim 11, wherein the operating speed of the handle body is determined based on the determined time difference and the predefined stroke path spacing, the determined operating speed of the handle body is compared a stored threshold speed, the operating speed of the handle body is not permissible if the operating speed is greater than or equal to the predefined threshold speed, the operating speed of the handle body is permissible if the operating speed of the handle body is less than the threshold speed.

15. The method of claim 14, wherein the stroke path spacing is determined by calculations, measurements, or simulations, the threshold time duration is determined by calculations, measurements, or simulations, or the threshold speed is determined by calculations, measurements, or simulations.

16. The method of claim 14, wherein the stroke path spacing is in a range of from 2 mm to 8 mm, the threshold time duration is in a range of from 4 ms to 16 ms, or the threshold speed is 500 mm/s.

17. The method of claim 11, wherein the first or second sensor device transmits further measuring signals to the control device after a triggering, and the further measuring signals or a temporal course of the further measuring signals are included in the determination of the permissibility of the operating speed of the handle body.

18. The method of claim 11, wherein, along the stroke path of the handle body the first and second triggering positions are between the rest and actuation positions, the first triggering position is between the rest position and the second triggering position, and the second triggering position is between the first triggering position and the actuation position.

* * * * *